(12) United States Patent
Kurtzberg et al.

(10) Patent No.: US 6,574,542 B1
(45) Date of Patent: Jun. 3, 2003

(54) DYNAMIC TECHNIQUE FOR USING CORRECTIVE BRAKING/ACCELERATING ACTIONS ON VEHICLES

(75) Inventors: Jerome M. Kurtzberg, Yorktown Heights, NY (US); Menachem Levanoni, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/045,765

(22) Filed: Jan. 14, 2002

(51) Int. Cl.$^7$ .............................................. G06F 19/00
(52) U.S. Cl. ..................... 701/70; 701/110; 123/361; 123/399
(58) Field of Search ............................ 701/70, 83, 84, 701/110; 123/399, 361

(56) References Cited

U.S. PATENT DOCUMENTS 5,477,825 A * 12/1995 Hattori et al. ............... 123/399
5,532,929 A * 7/1996 Hattori et al. ............... 701/110

* cited by examiner

*Primary Examiner*—William A Cuchlinski, Jr.
*Assistant Examiner*—Marthe Y. Marc-Coleman
(74) *Attorney, Agent, or Firm*—Whitham, Curtis & Christofferson, P.C.; Stephen C. Kaufman

(57) ABSTRACT

A method utilizing continual sensor-based data to design an adjustable set of corrective braking/accelerating actions for a vehicle. The invention capabilities include cognizance of the dynamic workings of the vehicle in a changing real environment. For example, the forces and accelerations experienced by the vehicle during normal driving operations, may be taken into design account, to thereby provide an optimal balance between safety, support, and comfort.

12 Claims, 1 Drawing Sheet

DYNAMIC TECHNIQUE FOR USING CORRECTIVE BRAKING/ACCELERATING ACTIONS ON VEHICLES

BACKGROUND OF THE INVENTION

1. Field of the Invention

This invention relates to methodology for utilizing continual sensor-based data to design and adjust corrective braking/accelerating actions on vehicles experiencing out-of-control-conditions, in a given dynamic environment, due to bumpy rides.

2. Introduction to the Invention

Current techniques to control bumpy rides rely on driver's skill and are not very effective. Automatic corrective braking/accelerating action techniques do not exist. Only static mechanical/hydraulic brakes are in effect today. We note, here, that no attention is given to the dynamic workings of the vehicle in the changing real environment. Specifically, the stresses and accelerations experienced by the vehicle during normal operation are not taken into account, nor is an optimum balance, between safety and comfort, taken into account.

SUMMARY OF THE INVENTION

We have now discovered novel methodology for exploiting advantages inherent generally in sensing the dynamic workings (forces) on specific vehicles in actual motion, and using this sensor-based data to improve or optimize the construction and operation of corrective braking/accelerating actions tools.

Our work proceeds in the following way.

We have recognized that a typical and important paradigm for presently controlling bumpy rides, is a largely static and subjective human paradigm, and therefore exposed to all the vagaries and deficiencies otherwise attendant on static and human procedures. In sharp contrast, the novel paradigm we have in mind works in the following way.

First, a vehicle is equipped with a set of force and accelerations sensors mounted, say, inside a vehicle-encasing device (harness). These sensors record their associated forces and accelerations produced in normal vehicular motion in its dynamic environment for a prescribed period of time, preferably sufficient to capture all possible force and acceleration patterns.

The dynamically acquired data are fed into a computer which creates a map of the forces and accelerations experienced by the examined vehicle. This information may be used to design a preferably optimal set of corrective braking/accelerating actions which preferably maximizes support and minimizes discomfort, and result in a computer-based construction of said set of actions that offers preferably optimal performance to the examined vehicle in its normal operation. This physical sequence of corrective actions preferably provides maximum safety, support and maximal comfort to its driver and passengers, following the optimal design of the corrective braking/accelerating actions.

Accordingly, we now disclose a novel computer method which can preserve the advantages inherent in the static approach, while minimizing the incompleteness and attendant static nature and subjectivities that otherwise inure in techniques heretofore used.

To this end, in a first aspect of the present invention, we disclose a novel computer method comprising the steps of:

i) mounting pressure and acceleration sensors in a vehicle-enclosing device;

ii) transmitting data produced by said sensors during actual operation of said body-enclosing device attached to a specific vehicle; and iii) creating a force-and-acceleration map based on said sensor-based data.

Preferably, the method includes a step for designing a model for a set of corrective braking/accelerating actions providing thereby optimal safety, support, and comfort based on the force-and-acceleration map; and, preferably includes a further step of constructing a physical sequence of actions based on a design provided by the model.

BRIEF DESCRIPTION OF THE DRAWING

The invention is illustrated in the accompanying drawing, in which.

DETAILED DESCRIPTION OF THE PRESENT INVENTION

Figure 1:
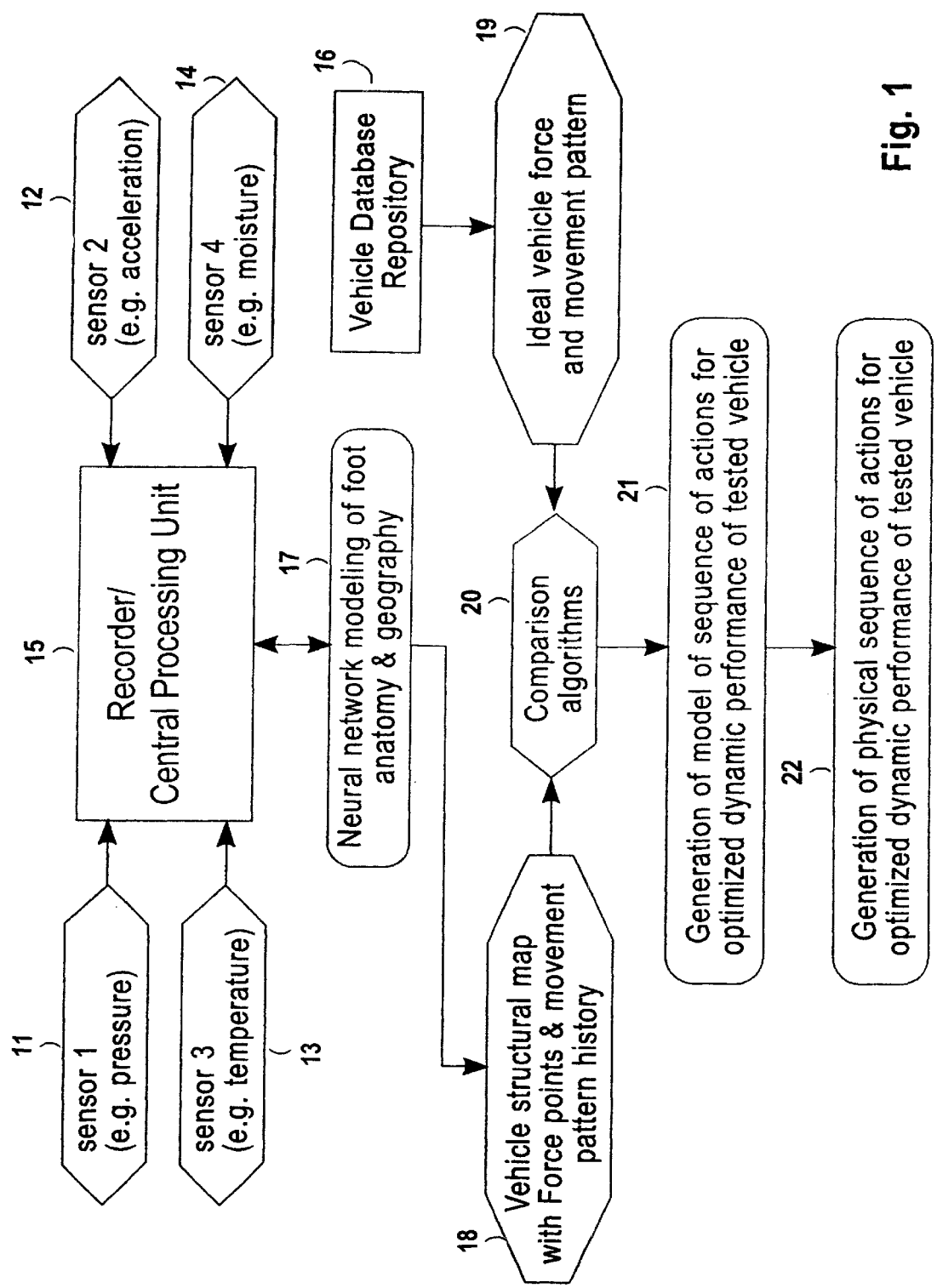
FIG. 1 provides an illustrative flowchart comprehending overall realization of the method of the present invention.

Attention is now directed to FIG. 1, which provides an overview flowchart for a typical and illustrative realization of the present invention.

In a typical case, a vehicle may be fitted with a temporary harness (not shown) comprising a number of sensors, located at prescribed locations on the tested vehicle. These sensors may include conventional pressure or force sensors 11, acceleration sensors 12, temperature sensors 13, and/or humidity sensors 14, and are preferably connected to a conventional recording device 15.

The harness fitted vehicle goes through its normal routine for several operational days. During the test period, sensor data are recorded (including time stamps) in the recording device 15. Then the harness and the recording device are returned at the end of the test period. The information stored in the recording device is then downloaded to a computer, here represented by central processing unit in place of recording device 15, which can store all data in a database 16.

The data are then analyzed by a program (preferably a neural network modeling program 17), which can create a map 18 of the tested vehicle at different times and road conditions. This map also contains the sensors' readings at different times and under different conditions. Thus, this system now has information on the dynamic behavior of the tested vehicle, including parametric information.

In addition to the map 18 generated for the tested vehicle, there is also a map 19 of an ideal vehicle force and movement pattern. A comparison of the map 18 for the tested vehicle and of the map 19 of an ideal vehicle under similar conditions is made with comparison algorithms 20. Based on the output of the comparison algorithms 20, an optimization program 21 designs an optimized sequence of actions for the vehicle. This design is then fed to a system 22 which can generate an optimized physical sequence of actions.

What is claimed:

1. A computer method comprising the steps of:

i) mounting force and acceleration sensors in a vehicle-enclosing device;

ii) transmitting data produced by said sensors during actual operation of said vehicle-enclosing device attached to a specific vehicle for subsequent analysis by a computer; and iii) creating a force-and-acceleration map based on said sensor-based data.

2. A computer method according to claim 1, comprising a step of creating a model of a set of corrective braking/accelerating actions for safety, support and comfort based on the force-and-acceleration map.

3. A computer method according to claim 2, comprising a step of constructing a physical sequence of actions based on a design provided by the model.

4. A method according to claim 2, comprising a step of using an interpolation technique to completely map forces and accelerations experienced by a vehicle over a period of time.

5. A method according to claim 4, comprising a step of updating the model by using the interpolating map.

6. A method according to claim 5, comprising a step of using the interpolated map to directly design the model in an optimal manner.

7. A method according to claim 1, comprising a step of using a sensor selected from the group consisting of temperature, moisture, and road conditions, so that sensor output may be correlated with safety, support and comfort when using a physical sequence of actions.

8. A method according to claim 1, comprising a step of using a linear technique to model a sequence of actions.

9. A method as in claim 8, comprising a step of employing neural networks as the modeling technique.

10. A method according the claim 8, comprising a step of employing regression as the modeling technique.

11. A method according to claim 8, comprising a step of employing expert systems as the modeling technique.

12. A program storage device readable by a machine, tangible embodying a program of instructions executable by the machine to perform method steps for correcting braking/accelerating actions on a vehicle, comprising the steps of:
   a) analyzing recorded sensor-based data generated by
      i) mounting force and acceleration sensors in a vehicle-enclosing device; and
      ii) transmitting data produced by said sensors during actual operation of said vehicle-enclosing device attached to a specific vehicle for subsequent analysis by a computer;
   b) creating a force-and-acceleration map based on said sensor-based recorded data; and
   c) generating during operation of the vehicle a set of corrective braking/accelerating actions for safety, support and comfort based on the force-and-acceleration map.

* * * * *